Figure 2:
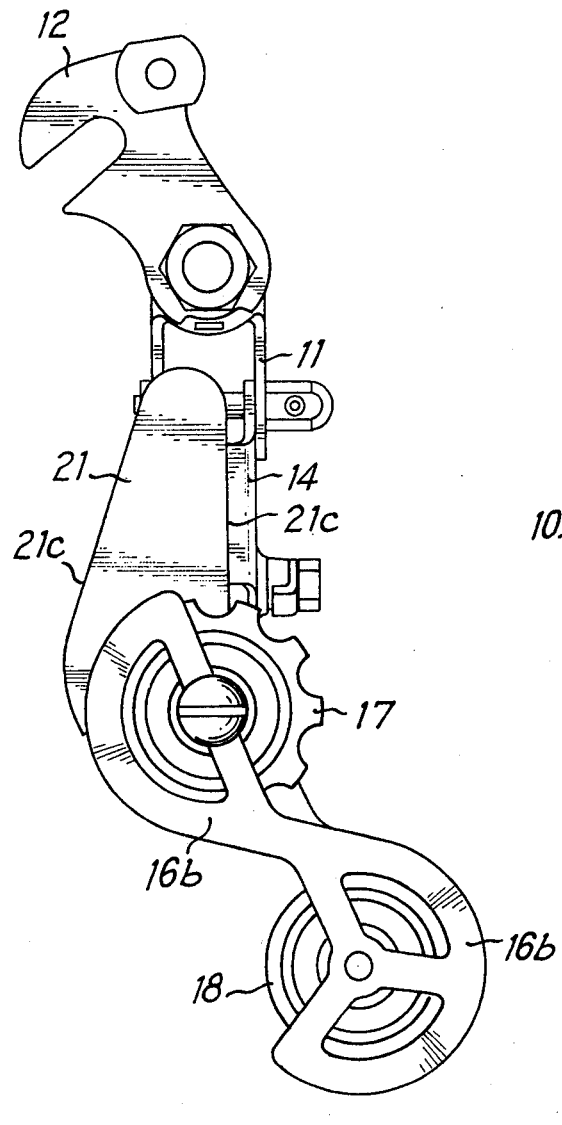

United States Patent [19]

Huret et al.

[11] 4,061,048
[45] Dec. 6, 1977

[54] BICYCLE GEAR CHANGE

[76] Inventors: Roger H. Huret; Jacques A. Huret, both of 60, av. Felix Faure, Nanterre, France, F 92000

[21] Appl. No.: 695,883

[22] Filed: June 14, 1976

[30] Foreign Application Priority Data

June 12, 1975 France .................. 75.18467

[51] Int. Cl.² .............................. F16H 7/22
[52] U.S. Cl. .................. 74/242; 74/217 B; 74/242.11 B; 74/242.15 B
[58] Field of Search ........... 74/217 B, 242, 242.11 B, 74/242.15 B

[56] References Cited

U.S. PATENT DOCUMENTS

| | | | |
|---|---|---|---|
| 3,910,136 | 10/1975 | Juy | 74/217 B |
| 3,960,025 | 6/1976 | Juy | 74/217 B |
| 3,994,167 | 11/1976 | Juy | 74/242 |

*Primary Examiner*—Samuel Scott
*Assistant Examiner*—Allan R. Burke
*Attorney, Agent, or Firm*—Irvin A. Lavine

[57] ABSTRACT

A bicycle derailleur gear change provides improvements to existing systems which utilize a pivoted yoke carrying the pivots of a chain guide roller and a chain tension roller and a displacement device which includes two parts one of which is fixed to the bicycle frame and the other supports the guiding device and moves relative to the first to move the guiding device transverse to the bicycle wheel and across the gear change sprockets. In the present device the guiding device has a guide lug which pivots relative to the yoke in a plane perpendicular to the axis of the sprockets and common with that of the cheek of the yoke. A mechanical linkage is connected to the displacement device and pivots the lug when the guiding device moves transversely so as to bring the free end of the lug adjacent the selected sprocket corresponding to the position of the guiding device.

10 Claims, 20 Drawing Figures

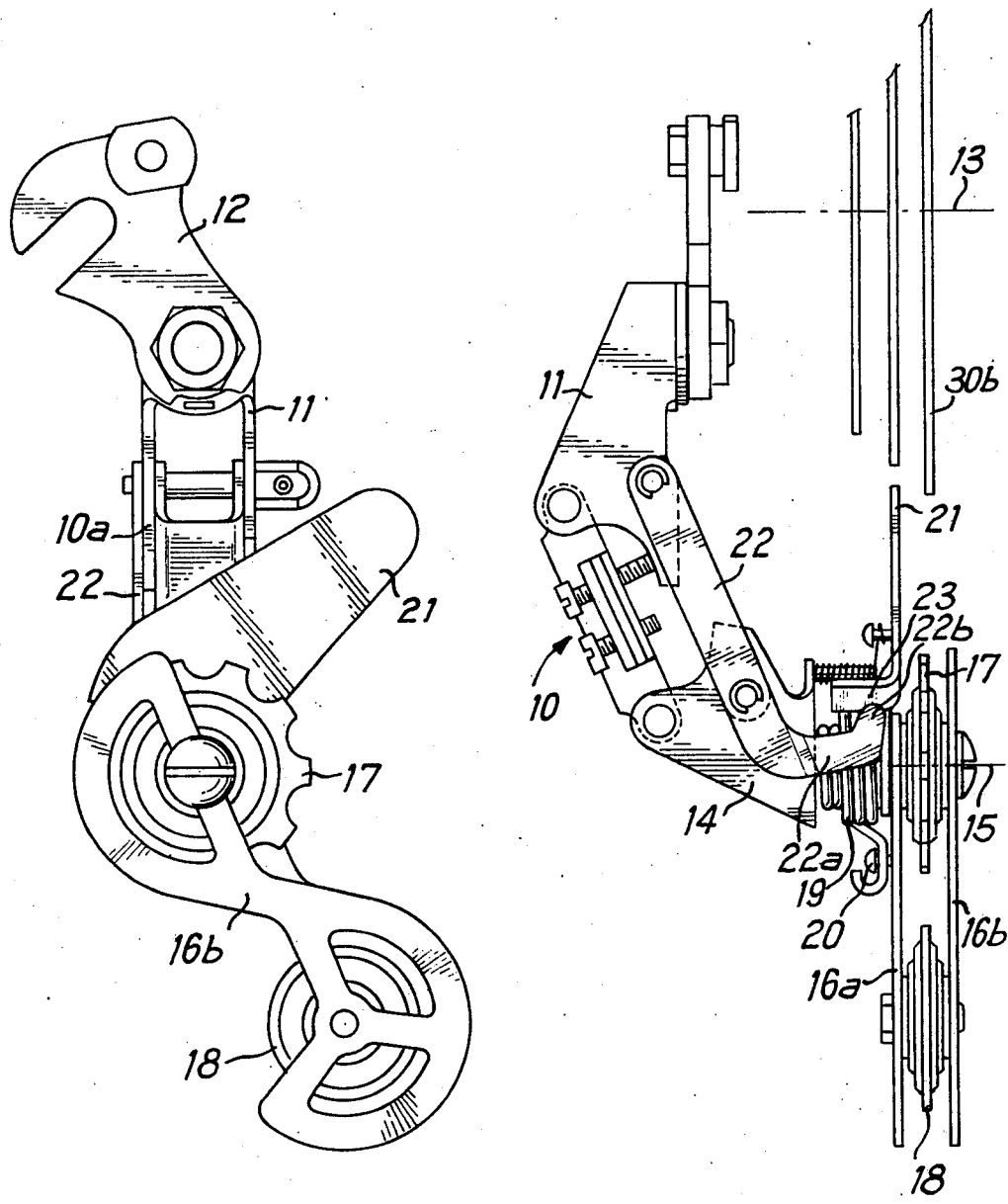

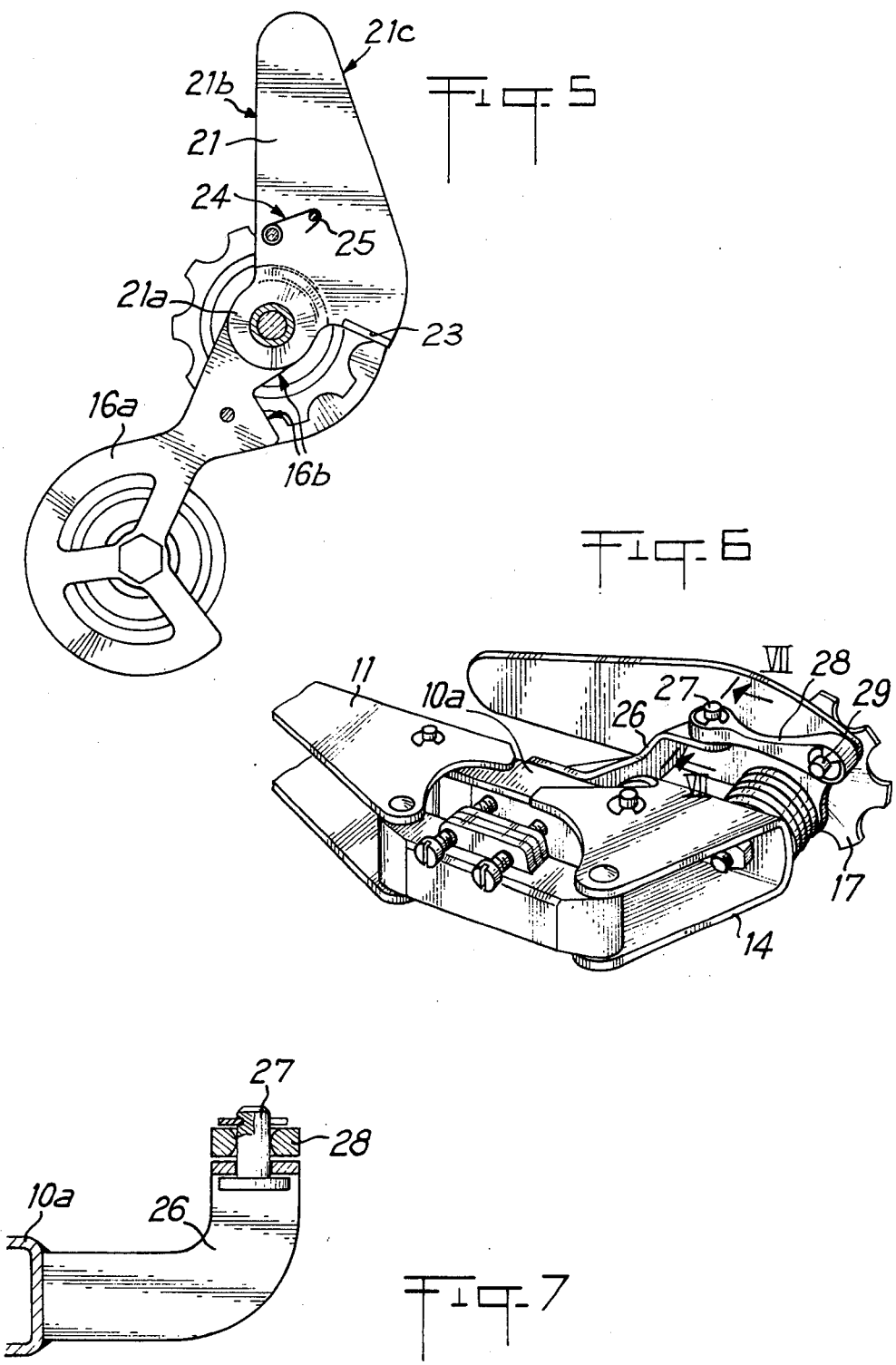

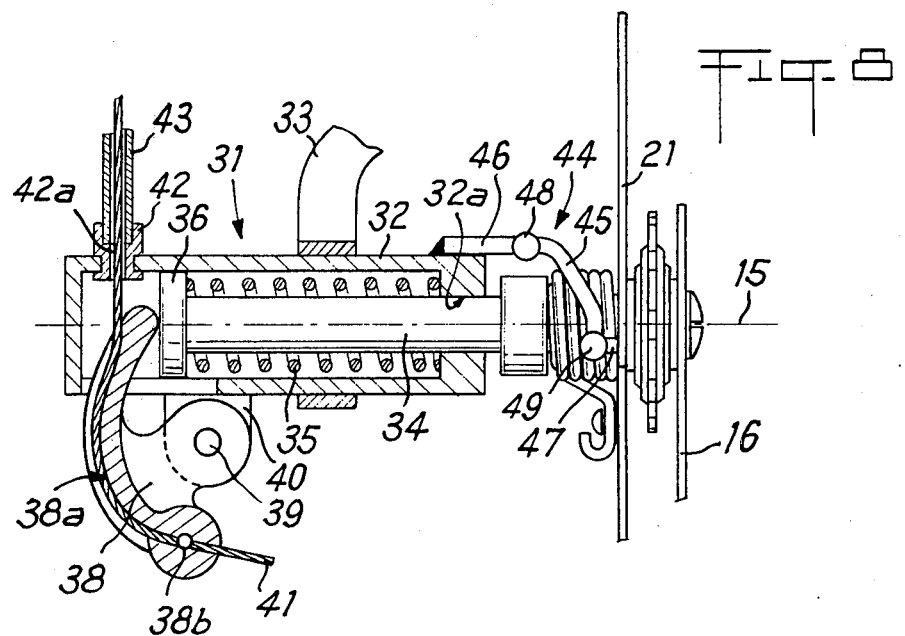
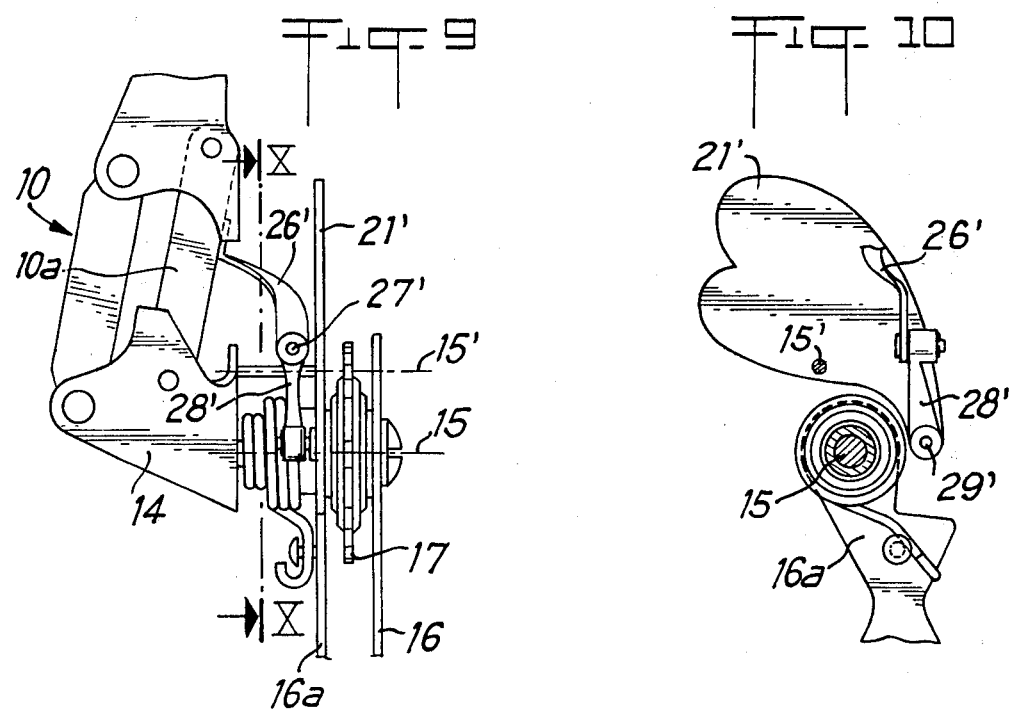

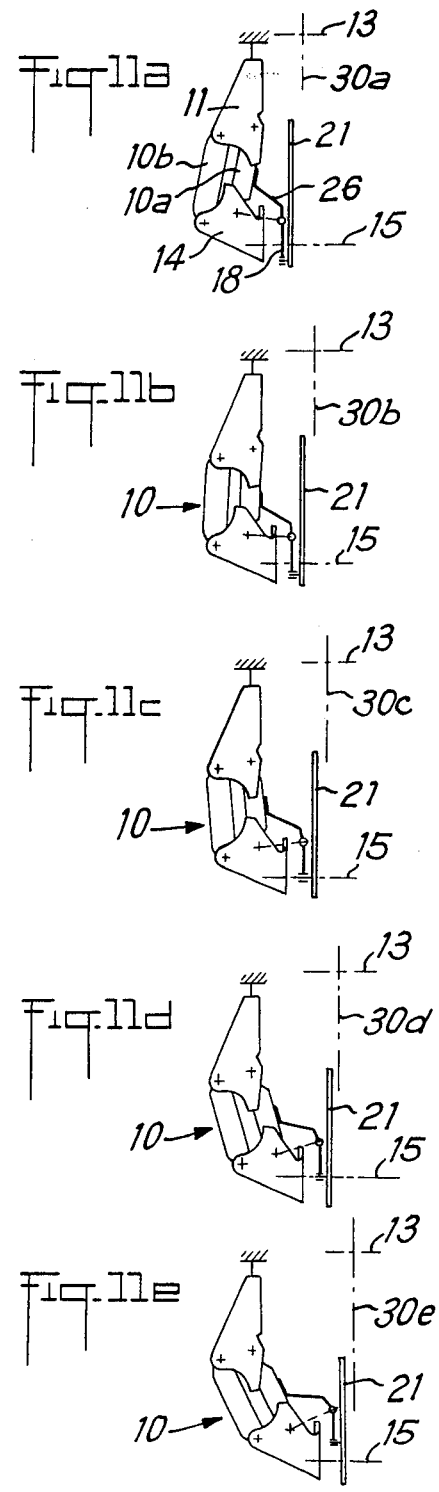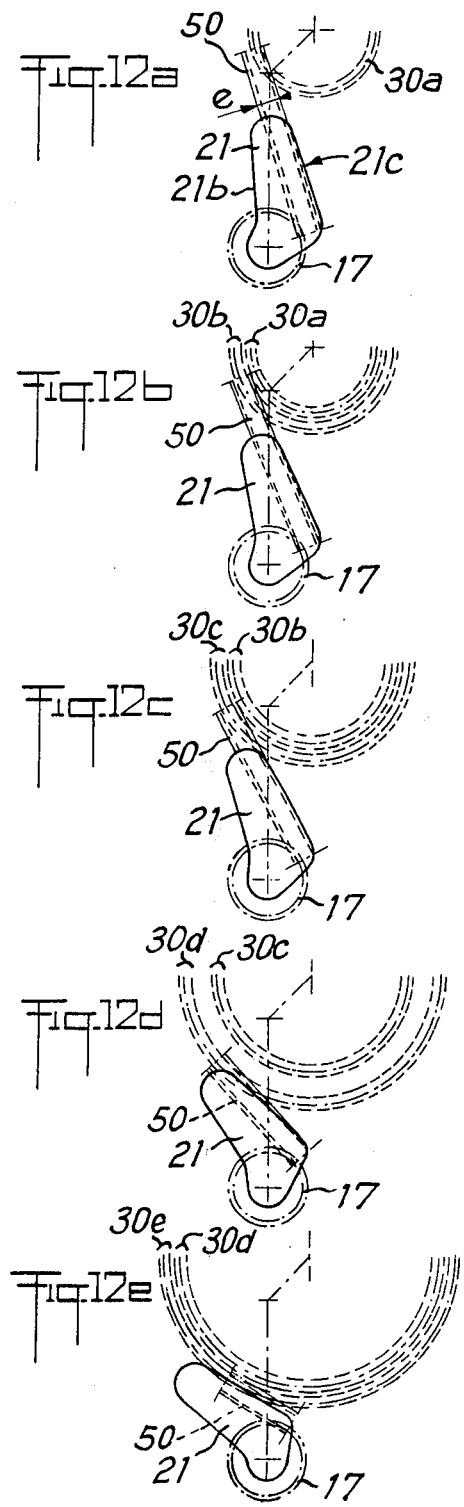

BICYCLE GEAR CHANGE

This invention relates to a derailleur bicycle gear change, and in particular to a derailleur gear change which has a device for guiding the chain comprising an articulated yoke carrying the pivots of a chain guide roller and a chain tension roller, and a displacement device comprising a first part integral with the frame of the bicycle and a second part which acts as a support for the guiding device, the second part being capable of movement in relation to the first in order to effect a transverse displacement of the guiding element in relation to the rear wheel of the bicycle carrying the gear sprockets, parallel to the common axis of the chain sprockets of the wheel.

The technique of controlling the movement of the chain from one sprocket to another of a rear bicycle wheel by means of a displacement device, operated for example by a cable, is well known, and it causes a transverse displacement of the yoke carrying the guiding and chain tension rollers in order to bring the chain guide roller opposite a selected sprocket. Such a displacement device is usually a movable parallelogram linkage situated in a plane parallel to the wheel axis and having one side integral with the frame of the bicycle and another side supporting the yoke. Another type of displacement device also known is a jack perpendicular or inclined to the plane of the wheel, of which a component part, for example the cylinder, is integral with the frame of the bicycle and of which another component part, for example the piston, supports the yoke.

The movement of the chain from one sprocket to another by simple transverse displacement of the yoke and therefore of the chain guide roller is often faulty in action, particularly when the diameter of the last sprocket is large. In this case, in fact, the guiding element, comprising the yoke and the chain guide roller, is located at a distance from the common axis of the sprockets at least equal to the radius of the largest sprocket. Furthermore when it is required for instance to move the chain from the smallest sprocket to the adjacent one, between the element for guiding the chain and the circumference of the smallest sprocket there is a sufficiently large distance for the chain, because of its relative flexibility, to remain engage on the smallest sprocket even when the chain guide roller is brought to a position opposite the adjacent sprocket. It is therefore necessary to move the guide chain roller beyond the adjacent sprocket, and this, in the majority of cases, causes the chain to move directly from the smallest sprocket to a larger one omitting one or more intermediate sprockets.

To overcome the above-mentioned disadvantage, the size of one of the cheeks of the yoke may be increased to improve the guiding of the chain between the chain guide roller and the sprockets. However, the maximum size of the cheek is necessarily limited if the latter is to be prevented from coming into contact with the sprockets.

A known solution which allows the guiding element to be brought into immediate proximity with a sprocket to which the chain must be transferred, consists of interposing between the movable parallelogram linkage and the guiding element a second movable parallelogram linkage which has a first side connected to a side of the first parallelogram linkage and a second side supporting the guiding element and which is situated in a plane perpendicular to the wheel axis. This solution, although satisfactory in principle from the technical point of view, has the disadvantage of requiring the use of an additional part quite complex and delicate to achieve, and therefore a high cost price.

The aim of the present invention is also to provide a derailleur bicycle gear change, which, without necessitating additional complex and costly parts, will achieve with certainty the movement of the chain from one sprocket to any other under the control of a device for transverse displacement in relation to the wheel.

According to the invention a derailleur bicycle gear change comprises a chain guiding device having a pivoted yoke carrying the pivots of a chain guide roller and a chain tension roller and a displacement device including a first part arranged to be fixed to the frame of the bicycle and a second part which acts a support for the guiding device, said second part being arranged to be movable in relation to the first part in order to cause the guiding device to move transversely in relation to the rear wheel of the bicycle along gear change sprockets associated with the wheel, the guiding device incorporating a guiding member in the form of a guiding lug mounted so as to pivot in relation to said yoke in a plane perpendicular to the axis of the sprockets and common to that of a cheek of the yoke, and the gear change further comprising a mechanical linkage device connected to said displacement device and arranged to cause the guiding lug to pivot when said guiding device moves transversely so as to bring the free extremity of the guiding lug adjacent the circumference of the sprocket whose position corresponds to that of the guiding device.

A primary advantage of the gear change according to the invention resides in the fact that the guiding of the chain towards a sprocket is simply carried out by means of a guiding lug which pivots when the displacement device is operated, thus without requiring between the device and the guiding element the installation of an additional complex part such as a movable parallelogram linkage, intended to cause the guiding unit to move perpendicularly to the axis of the sprockets at the same time as it undergoes movement parallel to that axis.

Advantageously, the guiding lug constitutes a pivotable part of a cheek of the yoke, and forms an extension of the cheek in the direction of the sprockets.

The guiding lug may be pivoted about an axis carried by said second part of the displacement device, this axis being common with, for example the axis about which the yoke is pivoted.

When the displacement device is a movable parallelogram linkage with a first side integral with the frame of the bicycle, and the side opposite the first supporting the guiding device, the pivoting of the guiding lug may be achieved by means of a mechanical linkage device which comprises an arm integral with a side of the parallelogram linkage adjacent to the first side and an operating part which is connected to the afore-mentioned arm, which is moved in a plane parallel to that of the guiding lug when the parallelogram is moved and which works with the guiding lug, to allow the pivoting of the latter when the parallelogram is moved.

The operating part may be a bent projection formed at the end of the aforesaid arm and co-operating with a contact surface on the guiding lug, this contact surface geing perpendicular to the plane of the guiding lug, or, a small rod pivoted on the one hand at the end off the arm about an axis perpendicular to the plane of the parallelogram linkage and, on the other hand, about a pivot integral with the guiding lug the axis of which pivot is perpendicular to the plane of the guiding lug.

When the displacement device is a jack perpendicular or inclined to the plane of the rear wheel of the bicycle, the cylinder of which jack is integral with the frame of the bicycle and the rod of which supports the guiding device, the mechanical linking device may be in the form of an arm one end of which is pivoted on a ball and socket joint integral with the jack cylinder and the other end of which is pivoted on a ball and socket joint integral with the guiding lug.

Figure 1:
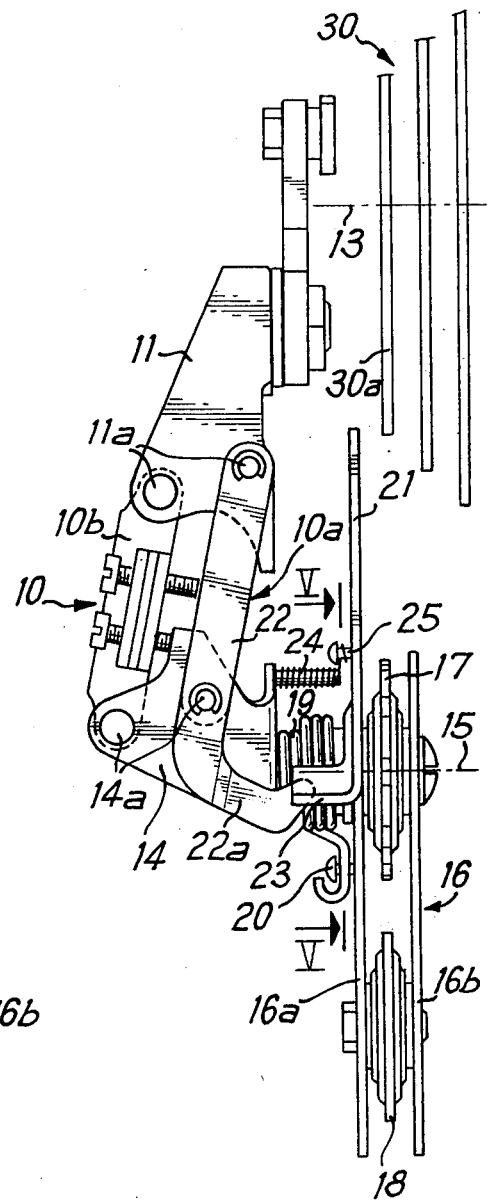

Other details and advantages of this invention will become clear with reference to the following description which is given by way of example only and with reference to the accompanying drawings in which:

FIGS. 1 and 2 are two diagrammatic views in end and side elevation of a first form of a gear change in accordance with the invention, FIGS. 3 and 4 are two elevations of the gear change as shown in FIGS. 1 and 2 respectively, showing a different position, FIG. 5 is a partial section along the line V—V in FIG. 1, FIG. 6 is a perspective view of a further gear change in accordance with the invention, FIG. 7 is a section along the line VII—VII in FIG. 6, FIG. 8 is a diagrammatic view in elevation of part of a third form of gear change in accordance with the invention, FIG. 9 is a diagrammatic view in elevation of a variation for the mounting of the guiding lug in the gear change in accordance with the invention, FIG. 10 is a section along the line X—X in FIG. 9, FIGS. 11a to 11e are five diagrammatic views in end elevation illustrating the various positions of displacement and guiding devices of a gear change in accordance with the invention, and FIGS. 12a to 12e are five diagrammatic views in side elevation showing the various positions corresponding to those shown in FIGS. 11a to 11e of the guiding lug in relation to the sprockets.

The derailleur gear change shown in FIGS. 1 to 5 comprises a displacement device consisting of a movable parallelogram linkage 10 of which a first side is formed by a yoke 11 integral with the frame of a bicycle (not shown), this being achieved for example by fixing a hook 12 of the yoke 11 on the hub of the rear wheel (not shown) whose axis, illustrated at 13, is common with the axis of the sprockets 30 of the wheel.

The two opposite sides 10a and 10b of the parallelogram linkages, adjacent to the first side, are formed by parallel arms each pivoted at one end, about pivots 11a mounted on the yoke 11, and at the other end about pivots 14a mounted in a yoke 14 which forms the side of the parallelogram linkage opposite the first side.

The yoke 14 serves as a support for an axle, whose axis is indicated at 15, which is parallel to the axis 13 and which carries a yoke 16 which has two cheeks 16a and 16b. The yoke 16 is pivotable about the axis 15. In the yoke 16 are mounted a chain guide roller 17 and a chain tension roller 18. The axis of the chain guide roller 17 is, in the example shown, common with the axis 15, whilst the axle of the chain tension roller 18 is carried by the cheeks 16a and 16b.

The yoke 16 is, in known manner, drawn back by a coil spring 19 wound about the axis 15 having one end hooked to a point 20 of the cheek 16a in order to give the chain (not shown) the necessary tension.

A guiding lug 21 is pivoted about the axis 15 and extends in a plane which is perpendicular to the axis 15 and the same as that of the cheek 16a, towards the sprockets 30 mounted on the axis 13.

The rear part of the lug 21 is fitted with a ring 21a for the purpose of mounting the lug about the axis 15 and next to the cheek 16a, the ring 21a being situated in a plane which is displaced in relation to that of the lug 21.

The cheek 16a is partially cut at 16b in the part adjacent to the chain guide roller 17, to allow the guiding lug 21 to pivot in relation to the yoke 16 (see FIG. 5), and the lug forms only a cheek part of the yoke 16, which part is completed by the guiding lug 21.

When the parallelogram linkage 10 is moved and the yoke 16 and the rollers 17 and 18 are displaced parallel to the axis 15, the pivoting of the guiding lug 21 about the axis 15 is controlled by means of an arm 22 which is made integral with the side 10a of the parallelogram linkage 10, for example by being mounted on the pivots 11a and 14a of the side 10a.

A part 22a of the arm 22 is bent in relation to the side 10a, and its end is formed with a projection 22b. The rear part of the guiding lug 21 has a tab 23 bent perpendicularly to the plane of the guiding lug and forming a contact surface for the projection 22b. The tab 23 is situated at the rear end of the upper edge 21c of the guiding lug 21.

FIGS. 1 and 2 on the one hand, and FIGS. 3 and 4 on the other, illustrate two different positions of the gear change in which the yoke 16 is opposite the smallest sprocket 30a and the largest sprocket 30b respectively, the sprockets 30 being five in number in the example shown.

When the chain is required to move from one sprocket to a larger sprocket, the parallelogram linkage 10 is moved to control a movement of the yoke 16 towards the right from the position shown in FIG. 1. The movement of the side 10a of the parallelogram gives rise to a corresponding movement of the arm 22 which, by means of its projection 22b exerts a force on the tab 23 which tends to cause the guiding lug 21 to pivot about the axis 15 in a downward direction.

When the chain is required to move from one sprocket to a smaller sprocket, the parallelograme linkage 10 is moved to control a movement of the yoke 16 towards the left in relation to its position as shown in FIG. 3. The projection 22b then tends to move away from the tab 23. In order to pivot the guiding lug 21 upwards, there is a return tension device such as a coil spring 24 wound about an axle 10 integral with the yoke 14 and with one end hooked to a point 25 on the guiding lug 21. The tab 23 is thus held against the projection 22b of the arm 22.

As already indicated, the tab 23, is located at the rear end of the upper edge 21c of the guiding lug 21 to facilitate control of the pivoting of the latter by the arm 22. The arm is an approximate L shape, the largest side of which is integral with the side 10a of the parallelogram 10 and the smallest horizontal side 22a of which is connected to the other side near the pivot 14a where the side 10a is pivoted. It will be noted that the lengths of displacement of the guiding lug 21 and of the arm 22, projected on the axis 15 are not equal and the tab 23 is therefore allocated a surface sufficiently large so that the projection 22b of the arm 22 touches it in all the positions of the gear-change.

The guiding lug 21 has a lower edge 21b which extends generally radially of the axis 15 and an upper edge 21c which, for the various positions of the guiding lug 21, extends generally parallel to the portion of the chain situated between the chain guide roller 17 and the sprocket to which the chain passes. Good guiding of the chain is thus ensured by bringing the guiding lug into a position near to the sprocket onto which the chain is to move, as explained in greater detail below with reference to the FIGS. 11a to 11e.

A second form of derailleur gear change is shown in FIGS. 6 and 7. The parts similar to this gear change and that illustrated in FIGS. 1 to 5 have the same reference numbers.

This second form of the gear change differs from that described above mainly in respect of the mechanical linkage device between the movable parallelogram linkage 10 and the guiding lug 21. As shown in FIGS. 6 and 7, the linkage device comprises a rigid arm 26 integral with the side 10a which extends in the direction of the guiding lug 21 and at the end of which is a pivot 27 whose axis is substantially parallel to the plane of the guiding lug 21. On the pivot 27 is pivoted one end of a small rod 28, the other end of which is pivoted about a pivot 29 integral with the guiding lug 21 with an axis perpendicular to the guiding lug.

When the parallelogram linkage 10 is moved, the arm 26 pulls or pushes the rod 28 which in turn pivots the guiding lug 21 downwards or upwards. A return spring is therefore not necessary for the guiding lug 21.

The pivot 29 is fixed on the guiding lug at the rear part of the latter and close to its upper edge 21c to facilitate the pivoting movement.

The extent of the projected movements of the arm 26 and of the guiding lug 21 on the axis 15 are not strictly equal and for this reason, the axes of the pivots 27 and 29 execute a small angular movement in relation to the axes of the corresponding holes of the small rod 28, when the parallelogram linkage 10 is moved. Furthermore, a clearance is provided between the pivots 27 and 29 and the corresponding holes 28a and 28b of the small rod 28, as shown in FIG. 7.

This clearance is attained for instance by giving each hole 28a and 28b a diameter which is virtually equal to that of the corresponding pivot in the median section of the hole and which increases slightly from the median section of the hole towards each aperture in this hole. In this way a slight pivoting of the pivot in relation to the axis of the hole in which it is inserted is permitted. However, in order to avoid any chance of parts getting stuck, the rod 28 is advantageously made of a flexible material, such as plastic.

A third form of gear change conforming with the invention is shown in FIG. 8. The transverse device is in the form of a jack 31 (shown in cross section), a cylinder 32 of which is fixed to the frame of the bicycle, for example by means of a support arm 33.

The jack 31 comprises a rod 34 of square section, for example, which slides in the cylinder 32 by being guided into and opening 32a of the frontal part of the cylinder, whose section corresponds to that of the rod 34.

A return spring 35 is lodged within the cylinder, about the rod 34, contacting on the one hand the frontal part of the cylinder surrounding the opening 32a and, on the other, a disc 36 on the interior end of the cylinder of the rod 34. The exterior end of the rod 34, by means of a linking piece 37, supports the axle having the axis 15, on which the yoke 16, the chain guide and chain tension roller and the guiding lug 21 are mounted in similar manner to that illustrated in FIG. 1. The connection between the axle and the rod 34 is achieved by screwing the axle into the rod 34 or by welding.

The movement of the rod 34, in opposition to the return force exerted by the spring 35, is achieved by means of a lever 38, the end of which is in contact with the disc 36 from the opposite side of the rod 34 and which penetrates the cylinder 32 through a longitudinal slot 32b made in the wall of the cylinder. The lever 38 is pivoted outside the cylinder 32 about a pivot 39 in a support 40 integral with the cylinder 32.

A control cable 41 passes through the opening 42a of a stop 42, fixed on the cylinder opposite the slot 32b, the stop serving as support for one of the ends of the casing 43 which surrounds the cable 41. The latter passes into a guiding groove 38a of the lever 38 and its end is fixed to the exterior end 38b of the lever 38.

The cable 41 therefore permits control of displacement parallel to the axis 15, of the yoke 16, the chain guide and chain tension rollers and the guiding lug 21. In order to superimpose a pivoting movement on the movement of translation of the guiding lug 21, the latter is connected to the cylinder 32 by means of a mechanical linking device 44. This device comprises an arm 45 which is pivoted on the one hand to the end of a tab 46 integral with the cylinder 32 and on the other hand, to he end of a nipple 47 integral with the guiding lug, by means of ball and socket joints, 48 and 49 respectively. The nipple 47 is situated at the rear support of the upper edge of the guiding lug 21.

The linking device 44 makes it possible for the guiding lug 21, pivoted about the axis 15 to pivot downwards when the transverse displacement device is actuated to control the displacement of the rod 34 towards the right as seen in FIG. 8.

In the three forms of a gear change described above, the guiding lug 21 is pivotally mounted about the pivot axis 15 of the yoke 16. The pivot points of the guiding lug 21 and the jointings of the yoke 16 may of course be separate, whilst remaining parallel, as shown in FIGS. 9 and 10.

The gear change shown in part in FIGS. 9 and 10 includes a displacment device and a mechanical linking device similar to those shown in FIG. 6.

The guiding lug 21' is pivotally mounted about an axis 15' parallel to the axis 15 and supported by the yoke 14. The plane of the guiding lug 21' is common to that of the cheek 16a.

The rear part of the guiding lug 21' carries a pivot 29' whose axis is substantially perpendicular to the plane of the lug, about which is pivoted one end of a small rod 28'. The other end of the rod 28' is pivoted about a point 27', whose axis is substantially perpendicular to that of the pivot 29', carried on an arm 26', integral with one side 10a of the parallelogram linkage 10. An angular clearance is provided for each pivot 27', 29' in the hole of the rod 28' on which they are located.

FIGS. 11a to 11e and 12a to 12e show the various positions of the displacement device and the guiding lug for a gear change according to the second form of the invention described above. The gear sprockets 30 are five in number in the example illustrated, with references 30a to 30e from smallest to largest.

The parts of the movable parallelogram linkage 10, the linking device incorporating the arm 26 and the rod 28, the axes 13 and 15, the chain guide roller 17, and also the sprockets are shown diagrammatically. In FIGS. 11a to 11e, only the axis 13 and the side of the parallelogram linkage formed by the yoke 11 are fixed.

It will be realised that in FIGS. 12a to 12e, the chain, indicated at 50, is in all cases guided by the guiding lug 21 over at lwast the largest part of the path between the chain guide roller 17 and the selected sprocket. This is achieved through the fact that the guiding lug 21 has a surface for guiding the chain which extends, for each position, from the level where the chain 50 leaves the chain guide roller 17 in the direction of the sprocket selected at a tangent both to the chain guide 17 and to the selected sprocket. In the present case, this guiding surface is limited by the upper edge 21c of the guiding lug this edge extending in a direction substantially tangential both to the chain guide roller 17 and to the selected sprocket, and being situated at a distance from the axis 15 approximately equal to the radius of the chain guide roller 17 plus the thickness e of the chain 50. The lower edge 21b of the guiding lug 21 is situated at a distance from the upper edge 21c greater than the thickness of the chain to allow correct guiding of the latter by the lug 21.

An important aspect to note, particularly in the case of FIG. 12e of the example illustrated, is that the minimum distance separating the axis 13 from the guiding lug when the latter occupies a position corresponding to the selection of a first sprocket, must be greater than the external radius of the sprocket immediately below this first sprocket to avoid all contact between the guiding lug and this lower sprocket.

As already mentioned, the guiding surface of the lug 21 extends in a direction substantially parallel to the common tangent of the chain guide roller and the selected sprocket, for each position. In addition, the angular extent of pivoting to be imposed on the guiding lug when passing from one sprocket to a following sprocket, may be easily predetermined in relation to the dimension and positions of the chain guide roller and the sprockets. This angular extent is not necessarily constant, and an average value may be chosen. When this average value has been determined, a mechanical link is made between the displacement device and the guiding lug which allows it to be obtained, particularly by correct selection of the distance between the pivot axis of the guiding lug and the point linking this lug to the mechanical linking device.

Finally, the length of the guiding lug, measured parallel to the tangent between the chain guide roller and a selected sprocket, is chosen particularly so that the maximum unguided length of chain between this lug and a selected sprocket is sufficiently small for the chain, in spite of its flexibility, not to remain on a sprocket adjacent to the selected sprocket, in particular, the sprocket immediately below.

Of course, various modifications or additions may be made to the various forms described above without departing from the invention. In particular, the forms for the guiding lugs 21, 21' are given by way of example only and the forms of mechanical linking device described above to connect between the displacement device and the guiding lug may have several variations.

What we claim as our invention and desire to secure by Letters Patent of the U.S. is:

1. A derailleur bicycle gear change comprising a chain guiding device having a pivoted yoke carrying the pivots of a chain guide roller and a chain tension roller and a displacement device including a first part arranged to be fixed to the frame of the bicycle and a second part which acts as a support for the guiding device, said second part being arranged to be movable in relation to the first part in order to cause the guiding device to move transversely in relation to the rear wheel of the bicycle gear change along sprockets associated with the wheel, the guiding device incorporating a guiding member in the form of a guiding lug mounted so as to pivot in relation to said yoke in a plane perpendicular to the axis of the sprockets and common to that of a cheek of the yoke, and the gear change further comprising a mechanical linkage device connected to said displacement device and arranged to cause the guiding lug to pivot when said guiding device moves transversely so as to bring the free extremity of the guiding lug adjacent the circumference of the sprocket whose position corresponds to that of the guiding device.

2. A gear change according to claim 1, wherein said guiding lug is a pivotable part of the cheek of the yoke and forms an extension of the cheek in the direction of the sprockets.

3. A gear change according to claim 1, wherein the guiding lug is pivoted about an axis carried by said second part of the displacement device.

4. A gear change according to claim 3, wherein the guiding lug and the yoke have common pivot axes.

5. A gear change according to claim 1 comprising a return spring exerting a return force in opposition to the pivoting of the guiding lug.

6. A gear change in accordance with claim 1, in which the displacement device is a parallelogram linkage with a first side arranged to be integral with the bicycle, the side opposite the first supporting the guiding device, the mechanical linkage device including an arm integral with one side of the parallelogram linkage adjacent to the first and an operating part which is connected to the arm, and which is moved in a plane parallel to that of the guiding lug when the parallelogram linkage is moved and which works with the guiding lug to allow the latter to pivot when the parallelogram linkage is moved.

7. A gear change according to claim 6, wherein said operating part is a bent projection formed at the end of the aforesaid arm and co-operating with a contact surface on the guiding lug, this surface being perpendicular to the plane of the guiding lug.

8. A gear change according to claim 6, wherein said operating part is a small rod pivotable on the one hand about the end of the arm and an axis perpendicular to the plane of the parallelogram linkage and, on the other hand, about a pivot integral with the guiding lug, the axis of which pivot is perpendicular to the plane of the guiding lug.

9. A gear change according to claim 1, in which the displacement device is a jack arranged to be perpendicular or inclined in relation to the plane of the bicycle wheel, and having a cylinder arranged to be fixed to the bicycle frame and a rod which supports the guiding device, the mechanical linking device incorporating an arm, an end of which is pivoted on a ball and socket joint on the jack cylinder and the other end of which is pivoted on a ball and socket joint on the guiding lug.

10. A gear change according to claim 1, wherein for each of its angular positions, the guiding lug has a guiding surface extending between the guide roller and the sprockets parallel to a common tangent to the chain guide roller and the selected sprocket, and the minimum distance between the guiding lug and the axis of the sprockets, for each position of the guiding lug corresponding to a selected sprocket, is greater than the external radius of the smaller sprocket immediately adjacent said selected sprocket.

* * * * *